United States Patent [19]

Katakura

[11] Patent Number: 5,953,500
[45] Date of Patent: Sep. 14, 1999

[54] MEDICAL IMAGE REPRODUCING SYSTEM

[75] Inventor: Yukiko Katakura, Kanagawa-ken, Japan

[73] Assignee: Fuji Photo Film Co., Ltd., Kanagawa-ken, Japan

[21] Appl. No.: 08/988,824

[22] Filed: Dec. 11, 1997

[30] Foreign Application Priority Data

Dec. 18, 1996 [JP] Japan .................................. 8-337862

[51] Int. Cl.⁶ .................................................. G06K 15/00
[52] U.S. Cl. .......................................... 395/111; 395/112
[58] Field of Search .................................... 395/101, 111, 395/112, 106; 346/134, 33 ME; 399/397, 401, 404, 405; 271/278, 279, 287, 288, 289, 290, 298; 706/924

[56] References Cited

U.S. PATENT DOCUMENTS 4,871,044  3/1989  Ogren ........................................ 702/187
5,361,085  11/1994 Vance ........................................ 347/101

*Primary Examiner*—Arthur G. Evans
*Attorney, Agent, or Firm*—Sughrue, Mion, Zinn, Macpeak & Seas, PLLC

[57] ABSTRACT

A medical image is taken by a CT, MRI, CR or the like and a medical image signal representing the medical image of the object is obtained. A sorting information signal on the medical image is attached to the medical image signal and transferred to a laser printer together with the medical image signal. The laser printer records on a predetermined recording medium a visible image reproduced on the basis of the image signal transferred and outputs the visible image recorded on the recording medium. A sorter distributes the visible image recorded on the recording medium to a selected one of a plurality of trays according to the sorting information signal attached to the image signal on the basis of which the medical image is reproduced. When a visible image attached with the same sorting information signal as the sorting information signal attached to a visible image which has been distributed to a tray before is output from the laser printer, the sorter distributes the former visible image to the same tray as the latter visible image.

6 Claims, 5 Drawing Sheets

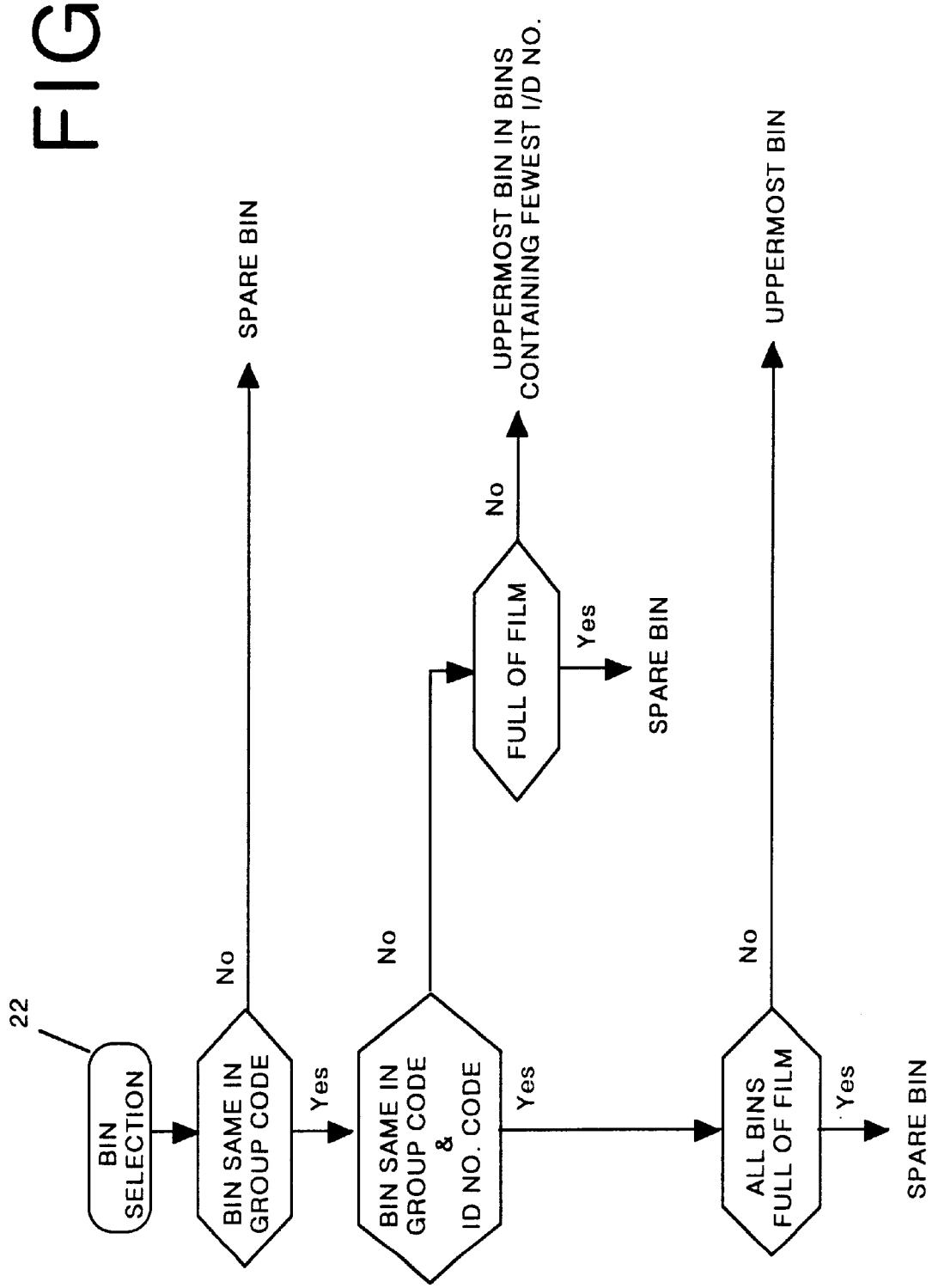

FIRST IMAGE A : 0000000001

SECOND IMAGE A : 0000000002

THIRD IMAGE A : 0000000003

FIRST IMAGE B : 0000000001

SECOND IMAGE B : 0000000002

THIRD IMAGE B : 0000000003

MEDICAL IMAGE REPRODUCING SYSTEM

BACKGROUND OF THE INVENTION

1. Field of the Invention

This invention relates to a medical image reproducing system for reproducing and recording on a recording medium such as a photosensitive material a medical image for diagnosis obtained by X-raying or the like, and more particularly to such a medical image reproducing system in which a plurality of recording media are distributed to a plurality of trays according to a predetermined algorithm after an image is recorded on each recording medium.

2. Description of the Related Art

There has been known a medical image reproducing system in which medical image data obtained from a recording system or a read-out system such as a CT, MRI, CR or the like is reproduced as a visible image on a recording medium such as a photosensitive material. Such a medical image reproducing system is sometimes provided with a sorting function of distributing recording media to a plurality of trays according to sorting information such as numbers representing the recording systems by which the images on the respective recording media were taken, thereby facilitating sort of the images.

For example, in U.S. Pat. No. 4,789,782, there is disclosed a medical image reproducing system which comprises a plurality of image read-out systems each of which reads out medical images recorded on stimulable phosphor sheets and a single image output system which outputs a plurality of recording media on which the images read out by the image read-out systems are reproduced, and in which the recording media are distributed to a plurality of trays according to the read-out system by which the image reproduced on each recording media is read out. Further there has been disclosed in U.S. Pat. No. 4,789,782 a medical image reproducing system in which the recording media are distributed to a plurality of trays according to the recording system by which the image reproduced on each recording media is taken. Further there has been disclosed in U.S. Pat. No. 4,789,782 a system in which the recording media are distributed to a plurality of trays according to the operator of the recording system by which the image reproduced on each recording media is taken, the object (patient), the department which requests the image or the like.

In any of these systems, trays are allocated in advance. For example, a first tray is for a first recording system, a second tray is for a second recording system, and so on. Then the recording media are distributed to the trays on the basis of information on the recording systems or the like.

The systems are disadvantageous in that since the trays must be allocated in advance, the number of kinds into which the images output from the image output system are to be divided must be estimated in advance and the number of trays allocated for the images of each kind must be estimated in advance.

However the number of kinds of the images and the number of images of each kind greatly vary day by day and it is sometimes difficult to estimate them in advance. For example, when the images are divided according to the recording system by which the images are recorded, it is relatively simple to estimate the number of kinds of the images and the number of images of each kind since the number of the recording systems is limited and generally smaller than the number of the trays. On the other hand, when the images are divided according to the kinds of the objects, the estimation is very difficult since the number of kinds of the objects is not limited and generally larger than the number of the trays.

SUMMARY OF THE INVENTION

In view of the foregoing observations and description, the primary object of the present invention is to provide a medical image reproducing system in which the recording media can be properly sorted without allocating the trays in advance.

The medical image reproducing system in accordance with the present invention comprises a medical image taking means which takes a medical image of an object and obtains a medical image signal representing the medical image of the object, a transfer means which attaches a sorting information signal on the medical image to the image signal and transfers the image signal attached with the sorting information signal, a recording means which records on a predetermined recording medium a visible image reproduced on the basis of the image signal transferred to the recording means and outputs the visible image recorded on the recording medium, and a sorting means which distributes the visible image recorded on the recording medium to a selected one of a plurality of trays or bins according to the sorting information signal attached to the image signal on the basis of which the medical image is reproduced, and is characterized in that when a visible image attached with the same sorting information signal as the sorting information signal attached to a visible image which has been distributed to a tray before is output from the recording means, the sorting means distributes the former visible image to the same tray as the latter visible image.

It is preferred that, when the tray to which said latter visible image has been distributed is full of visible images, the sorting means distributes said former visible image to another tray which is vacant or stores a relatively small number of visible images.

Specifically the sorting information signal represents information for identifying the object, information for identifying the medical image taking means by which the medical image is taken, the department which requests the medical image or the like. Further the sorting information signal may represent information on collation when a medical image is recorded on a plurality of recording media at one time.

A visible image attached with a sorting information signal which differs from any one of the sorting information signals attached to visible images which have been distributed before may be distributed to any one of the trays. That is, such a visible image may be distributed to a tray in which one or more visible images attached with different sorting information signals have been stored. In other words, visible images respectively attached with different sorting information signals may be distributed to one tray. However in order to uniformly distribute visible images to the respective trays, it is preferred that a visible image attached with a sorting information signal which differs from any one of the sorting information signals attached to visible images which have been distributed before be distributed preferentially to a tray storing therein a minimum kinds of visible images.

In the medial image reproducing system of the present invention, a visible image attached with the same sorting information signal as the sorting information signal attached to a visible image which has been distributed to a tray before is distributed to the same tray as the visible image which has been distributed before and a visible image attached with a sorting information signal which differs from any one of the sorting information signals attached to visible images which have been distributed before is distributed to a vacant tray or a tray which stores a relatively small number of visible images. Accordingly, the operation of estimating the number of kinds of the images and the number of images of each kind and allocating the trays becomes unnecessary and the event where no visible image is distributed to an allocated tray can be avoided.

Further by arranging the sorting means so that when a tray to which a visible image is to be distributed is full of visible images which have been distributed, the visible image is distributed to another tray which is vacant or stores a relatively small number of visible images, the event where too many trays are allocated to a certain kind of visible images and a part of the trays are kept vacant in vain can be avoided.

BRIEF DESCRIPTION OF THE DRAWINGS

FIG. 5 is a flow chart for illustrating the procedure of selecting a bin to which a visible image is distributed.

DESCRIPTION OF THE PREFERRED EMBODIMENT

Figure 1:
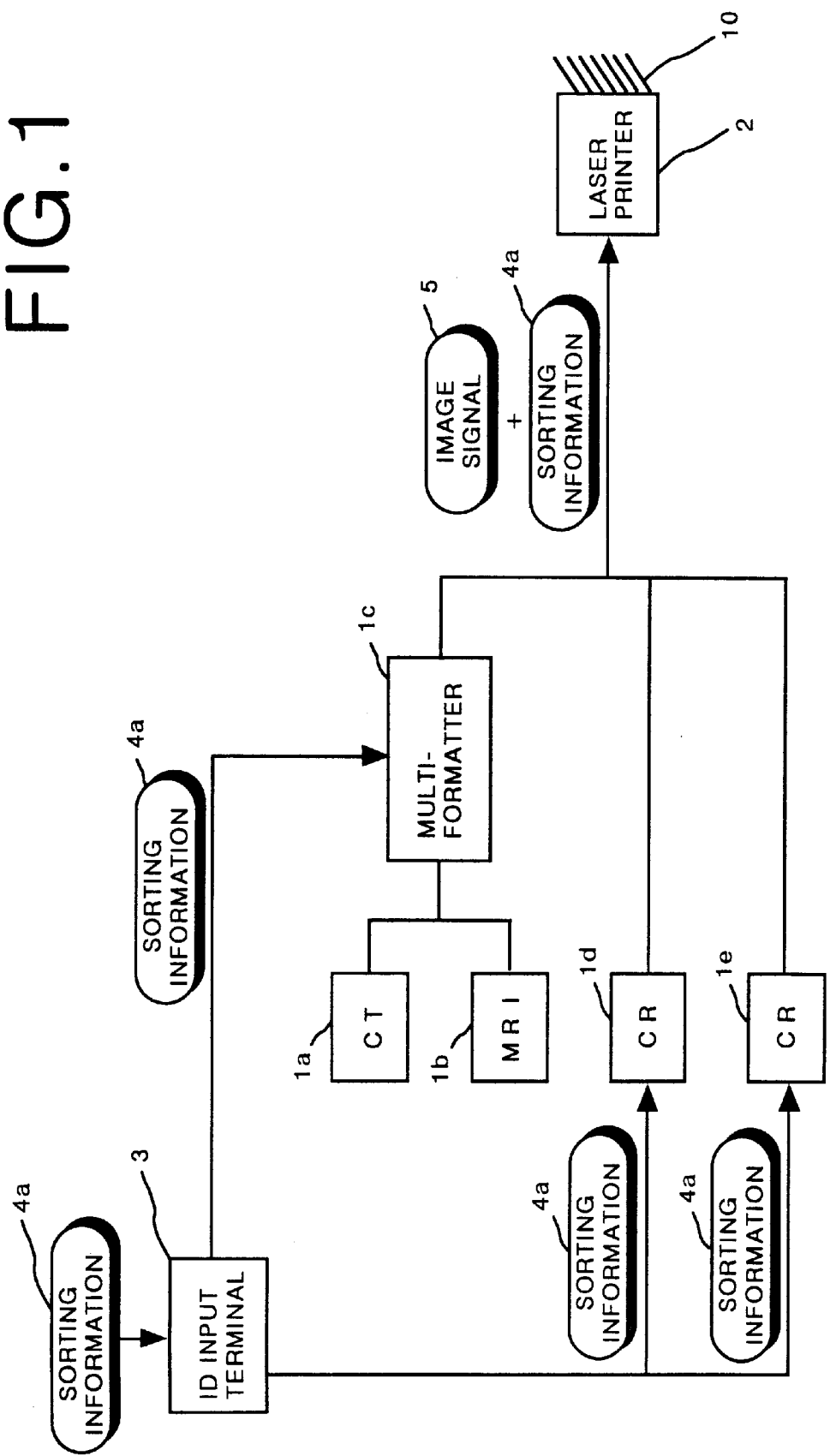
FIG. 1 is a block diagram for illustrating a medical image reproducing system in accordance with an embodiment of the present invention.

In FIG. 1, a medical image reproducing system in accordance with an embodiment of the present invention comprises four (three kinds of) medical image taking means, that is, a CT (computed tomogram) 1a, a MRI (magnetic resonance imager) 1b and a pair of CRs (computed radiogram) 1d and 1e, and medical images taken by the four medical image taking means 1 are recorded on sheets of photosensitive film by a laser printer 2. Medical images taken by the CT 1a and the MRI 1b are subjected to a layout processing, an enlargement/contraction processing and the like by a multi-formatter 1c in order to record a plurality of images on a sheet of film side by side and then output from the laser printer 2. The CT 1a, MRI 1b, CR 1d, CR 1e and multi-formatter 1c are generically referred to as "the medical image taking means 1", hereinbelow.

An image signal 5 representing a medical image taken by the medical image taking means 1 is transferred to the laser printer 2. When transferring the image signal, a sorting information signal 4a for sorting the image signal 5 is transferred together with the image signal 5. The sorting information signal 4a represents information on the object (patient), the medical department which requests to take the medical image of the patient, the kind of the image taking system (will be referred to as "modality", hereinbelow) and the like. For example, the information on the patient and the medical department can be obtained by reading the sorting information 4a recorded on a patient card or the like by an ID input terminal 3. The information on the modality can be prepared by the multi-formatter 1c or the CRs 1d and 1e. The aforesaid sorting information is just an example and the sorting information may further include, for instance, the operator who operates the medical image taking means, the ID number of the corporation to which the patient belongs and the like. Such information is assembled into data in a predetermined format by the multi-formatter 1c, the CR 1d or CR 1e.

Figure 2:
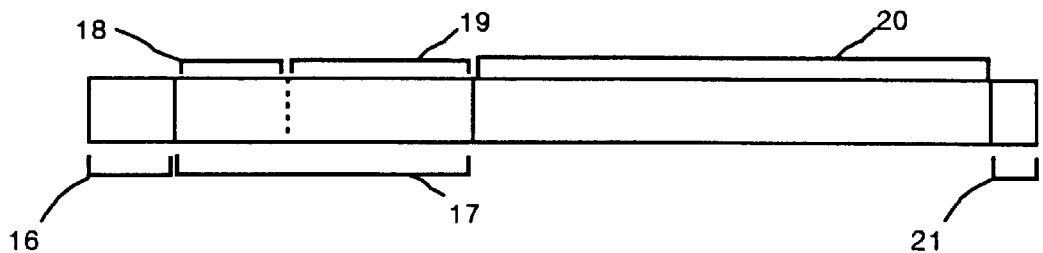
FIG. 2 is a view showing an example of a data format of the sorting information signal.

FIG. 2 shows an example of the data format of the sorting information. A command code 16 is a code which represents various instructions from the medical image taking means 1 to the laser printer 2 such as print command, reprint command and the like. The sorting information is information which is added as information necessary for printing when the command code 16 is print command or reprint command. A group code 17 is information for roughly grouping visible images (recorded on sheets of film) and comprises a modality code 18 representing the modality used in taking the medical image and a medical department code 19 representing the medical department requesting to take the medical image. Since the number of the modalities and the medical departments is limited, the two codes may be integrated into one code. A patient ID number 20 is a number for identifying the patient. Since the patient ID number 20 increases in its number of figures as the number of the patients increases, the patient ID number 20 need not be of a fixed length but may be of a variable length. In the latter case, the end of the data may be recognized by a termination character 21.

Each of the aforesaid codes may be either a character-string code, e.g., "CT" or "INTERNAL", or a numeric code allocated in advance in such a manner that "01" represents CT, "02" represents MRI, "101" represents the internal department, "102" represents the department of surgery and so on. It is preferred that codes which are not to be used for sorting be separated from codes which are to be used for sorting by inserting a space, a null character, or "ff" so that the user can select the information according to which sorting is effected. The sorting information signal thus assembled is transferred to the laser printer 2 together with the image signal 5.

Figure 4:
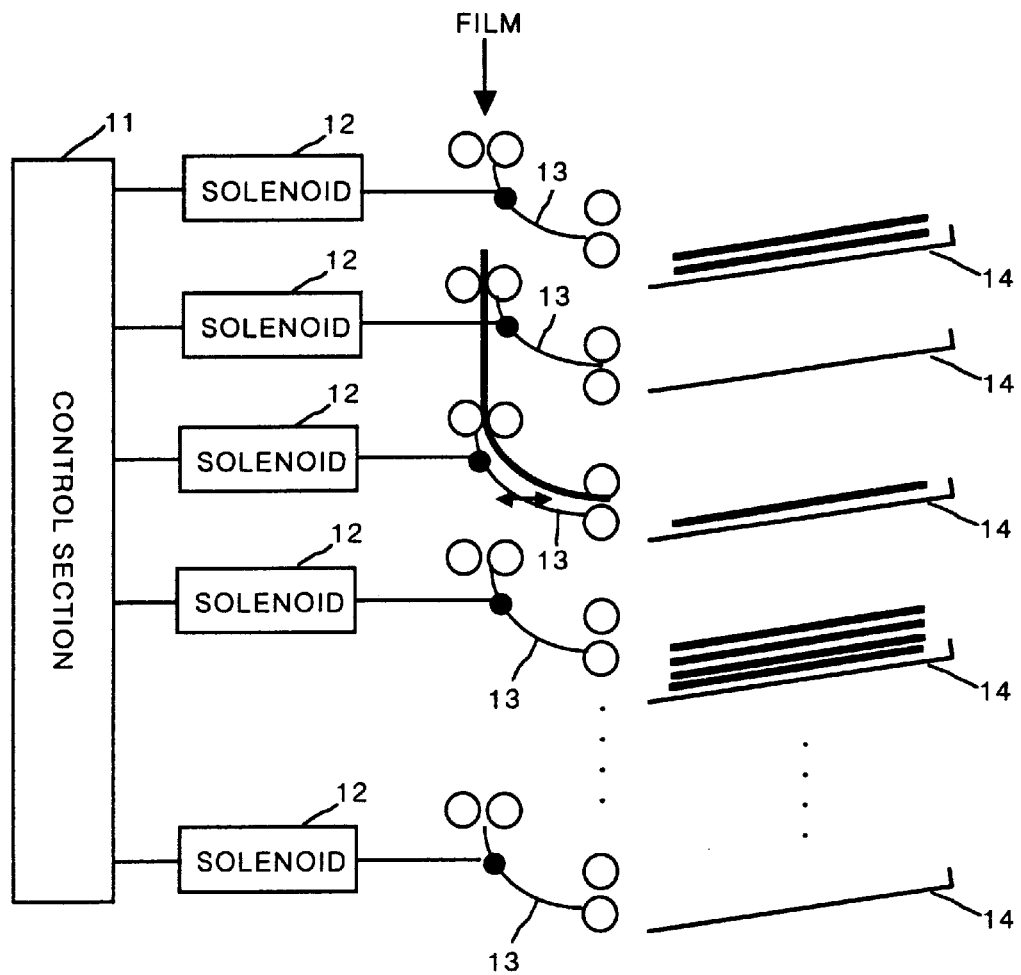
FIG. 4 is a view showing the structure of the sorter of the laser printer.
Figure 3:
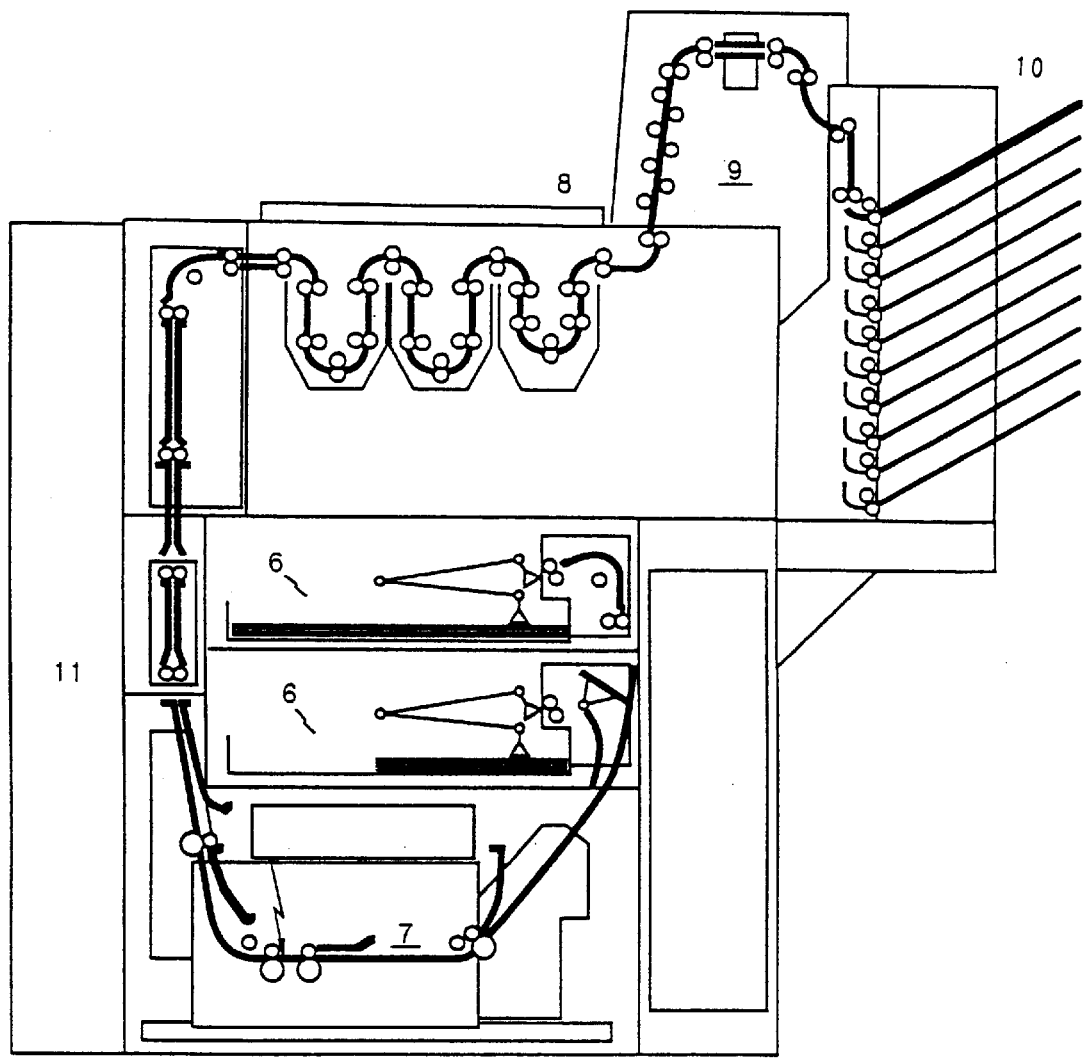
FIG. 3 is a view showing the structure of an example of the laser printer.

The laser printer 2 records a visible image on a sheet of film on the basis of the image signal 5 transferred from the medical image taking means 1. For the laser printer 2 is of a structure shown in FIG. 3. That is, as shown in FIG. 3, in the laser printer 2, a sheet of film is fed from a film loading section 6 to an image recording section 7. In the image recording section 7, an image is recorded on the film on the basis of the image signal input into the image recording section 7. Then the film is developed in a developing section 8 and dried in a drying section 9, and then distributed to one of a plurality of bins 14 (FIG. 4) by a sorter 10. As shown in FIG. 4, the sorter 10 is provided with a plurality of guides 13 each for one of bins 14. Each guide 13 is actuated by a solenoid 12 and by actuating one of the guides 13, the film is distributed to a selected bin 13.

The laser printer 2 is provided with a CPU (not shown) which executes a bin selection processing on the basis of the sorting information signal transferred from the medical image taking means 1 and inputs a control signal to a control section 11 of the sorter 10 on the basis of the result of the bin selection. The control section 11 drives one of the solenoid 12 to distribute the film to the selected bin. At this time, the CPU causes a memory (not shown) to store the sorting information on the film stored in the bin. That is, by referring to the memory, what kinds of film (with respect to the sorting information) are stored in each bin can be known and whether there exists a bin which stores film attached with the same sorting information as that of film transferred to the sorter 10 last can be known. Further if necessary, the number of sheets of film distributed to each bin may be stored in the memory and may be used in the bin selection processing.

For the modality code and the medical department code, which are limited in kinds, mapping of the code and the bin may be stored in the memory in advance upon initialization or the like as in the aforesaid conventional systems and only when a bin becomes full of sheets of film and another bin becomes necessary, the dynamic bin allocating described above may be effected.

FIG. 5 shows a flow chart for illustrating an example of the bin selection processing. In this example, sorting is effected by use of all the patient ID number code, the modality code and the medical department code. Since the modalities and the medical departments are limited in number, their codes are integrated into a group code and whether the sorting information is the same is determined on the basis of the group code. Further, in this example, the group codes are mapped with the bins in advance in an initialization processing and the patient ID number codes are not mapped.

When a sheet of film is transferred to the sorter 10, it is first determined referring to the memory whether there exists a bin in which a sheet of film which is the same in the group code as the newly transferred sheet of film is stored. In this example, since the group codes have been mapped with the bins in the initialization processing, it is determined that a relevant bin, in which a sheet of film which is the same in the group code as the newly transferred sheet of film is stored, exists even if no sheet of film is actually stored in the relevant bin so long as mapping of the group code and the relevant bin is stored in the memory. When it is determined that there exists no bin in which a sheet of film which is the same in the group code as the newly transferred sheet of film is stored, the newly transferred sheet of film is distributed to a spare bin.

When it is determined that there exists a bin in which a sheet of film which is the same in the group code as the newly transferred sheet of film is stored, it is further determined whether there exists a bin in which a sheet of film which is the same in the patient ID number code as the newly transferred sheet of film is stored. Since the patient ID number codes are not mapped, this determination is made referring to the memory exactly on the basis of whether such a bin exists. When it is determined that there exists no bin in which a sheet of film which is the same in the patient ID number code as the newly transferred sheet of film is stored, the newly transferred sheet of film is distributed to selected one of the bins each of which stores a sheet of film which is the same in the group code as the newly transferred sheet of film. The selected bin is the bin which is the uppermost bin in the bins which store a sheet of film which is the same in the group code as the newly transferred sheet of film and are not full of sheets of film and at the same time the number of different patient ID numbers attached to the sheets of film stored in which is the fewest.

When there exists a bin in which a sheet of film which is the same in both the group code and the patient ID number code as the newly transferred sheet of film is stored, the newly transferred sheet of film is distributed to the bin which is the uppermost bin in the bins which store a sheet of film which is the same in both the group code and the patient ID number code as the newly transferred sheet of film and are not full of sheets of film.

When a bin to which a sheet of film is to be distributed is full of sheets of film, the sheet of film is distributed to a spare bin if any and mapping of the sorting information code and the bin is stored in the memory. When there is no spare bin, alarm is generated. In this example, bins which are left not mapped upon end of mapping of the group code are spare bins. Otherwise some of the bins which are left not mapped upon end of mapping of the group code may be reserved for receiving a sheet of film which is in the course of transfer upon treating abnormality or initialization with the other of the bins which are left not mapped upon end of mapping of the group code and the bin used as spare bins.

The sorting information such as the patient ID number is for sorting medical images by their contents and accordingly when the sorting information differs, the image itself differs. To the contrast, a collation code described below is a code for distributing a plurality of sheets of film on which the same images are recorded to a plurality of bins and stacking a plurality of sheets of film carrying different medical images in each bin so that manual sorting becomes unnecessary when a plurality of stacks of different medical images are to be formed. In this case, a plurality of bins which are the same in number as the number of the sheets of film to be output for each medical image are required since if a plurality of codes are allocated for one bin, collation cannot be performed.

Figure 6:
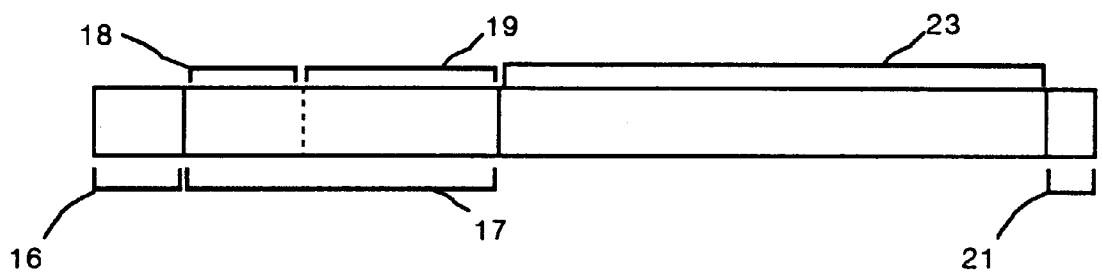
FIG. 6 is a view showing an example of a sorting information signal containing a collation code.

FIG. 6 shows an example of a sorting information signal containing a collation code. In this example, when each image is to be printed on three sheets of film, the sorting information must be transferred three times from the medical image taking means 1 to the laser printer 2, that is, print command must be output three times. Depending on the data format, it is possible to instruct on collation by one command.

The data format shown in FIG. 6 differs from that shown in FIG. 2 in that the collation code is stored in place of the patient ID number code. This is because distribution by the patient ID number and collation cannot be performed together since the number of the patients can be larger than the number of the bins. However when the number of the patients is apparently smaller than the number of the bins and distribution by the patient ID number can be performed together with collation, a data format containing both the patient ID number code and the collation code may be set. Distribution by the collation code can be performed in the same manner as the aforesaid distribution by the patient ID number code and the like.

What is claimed is:

1. A medical image reproducing system comprising
   a medical image taking means which takes a medical image of an object and obtains a medical image signal representing the medical image of the object,
   a transfer means which attaches a sorting information signal on the medical image to the medical image signal and transfers the medical image signal attached with the sorting information signal,
   a recording means which records on a predetermined recording medium a visible image reproduced on the basis of the image signal transferred to the recording means and outputs the visible image recorded on the recording medium, and
   a sorting means which distributes the visible image recorded on the recording medium to a selected one of a plurality of trays according to the sorting information signal attached to the image signal on the basis of which the medical image is reproduced,
   wherein the improvement comprises that
   when a visible image attached with the same sorting information signal as the sorting information signal attached to a visible image which has been distributed to a tray before is output from the recording means, the sorting means distributes the former visible image to the same tray as the latter visible image.

2. A medical image reproducing system as defined in claim 1 in which when the tray to which said latter visible image has been distributed is full of visible images, the sorting means distributes said former visible image to a tray other than the tray full of visible images.

3. A medical image reproducing system as defined in claim 1 in which the sorting information signal represents information for identifying the object.

4. A medical image reproducing system as defined in claim 1 in which the sorting information signal represents information for identifying the medical image taking means by which the medical image is taken.

5. A medical image reproducing system as defined in claim 1 in which the sorting information signal represents the medical department which requests the medical image.

6. A medical image reproducing system as defined in claim 1 in which the sorting information signal represents information on collation.

* * * * *